May 22, 1962 R. G. FRANK ETAL 3,035,341
MANUFACTURING METHOD FOR MAKING MOLYBDENUM
BASE ALLOY ARTICLES
Filed March 20, 1958
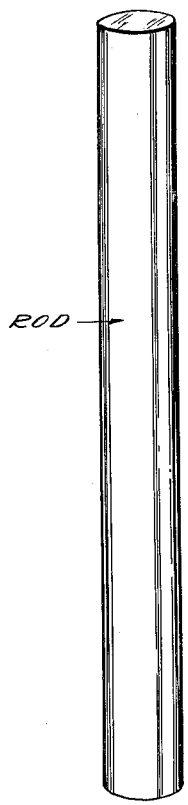
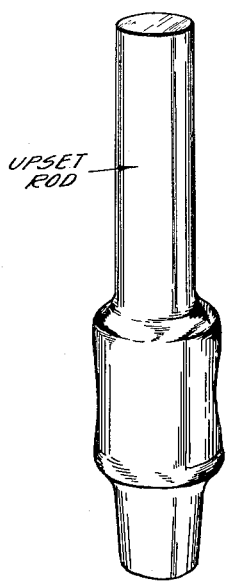
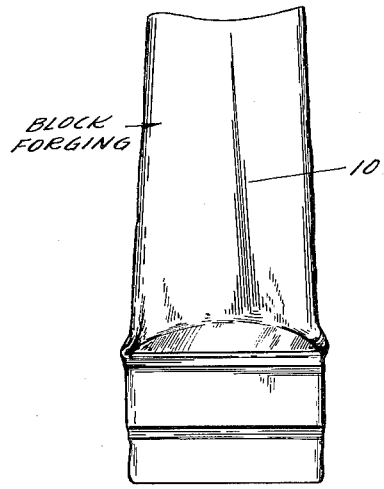
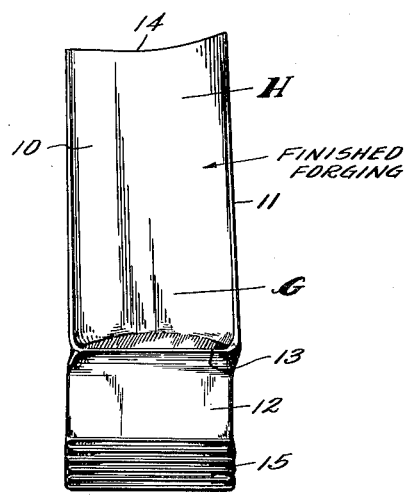
INVENTORS.
ROBERT G. FRANK
EDWARD S. JONES
BY
Lee H. Sachs
ATTORNEY—

3,035,341
MANUFACTURING METHOD FOR MAKING
MOLYBDENUM BASE ALLOY ARTICLES
Robert G. Frank and Edward S. Jones, Cincinnati, Ohio, assignors to General Electric Company, a corporation of New York
Filed Mar. 20, 1958, Ser. No. 722,675
6 Claims. (Cl. 29—552.2)

This invention relates to improved manufacturing methods for making molybdenum base alloy articles; and more particularly, it relates to metal forming processes such as upsetting and forging, including block-forging, finish-forging and hot drop-forging, to make molybdenum base alloy articles.

Molybdenum, because of its exceptionally high strength over 1800° F. and because it is readily available, is one of the most promising materials for applications in which high temperatures and high stresses are experienced. Such applications include use in thermal power plants such as gas turbines, and the like where increasingly high temperatures coupled with high stresses are being experienced as that technology advances.

Commercially available molybdenum alloys produced by both arc-cast and powder metallurgy methods derive a major portion of their strength from work hardening sometimes called "cold working": the development of hardness in metal as the result of plastic deformation. This deformation which results in a deformed grain structure is conducted at temperatures below the "recrystallization temperature" of the material. The "recrystallization temperature" is the lowest temperature at which the strained or distored grain structure brought about by cold working the metal is relieved of strain and decreased in hardness. If the material is heated above the recrystallization temperature, then the strength properties gained by cold working are lost. Forming procedures which produce cold worked structures and which are used in the processing of molybdenum alloys are vitally important in attaining desired properties. Since work hardened molybdenum can be recrystallized by heating above a fixed temperature, it is an unstable condition. Since the severe loss of strength due to recrystallization generally cannot be tolerated, heat treatments which can be given molybdenum alloys for annealing or prior to working are restricted to temperatures below the recrystallization temperature. Also of significance to a practical method of manufacture is the "reduction in material" in each step of forming. The "reduction in material" refers to the change in thickness at a given point after each working step. For a complex shape such as a blade airfoil, that thickness change will vary considerably after working when compared with an original regular shape such as a bar, rod, plate or sheet. Since the temperature range is critical to achieve good strength properties, and since a large reduction in material is desirable in a practical manufacturing process, an optimum combination of such temperatures and reduction in material is always sought when working with molybdenum base alloys.

Therefore, an object of our invention is to provide an improved process for making articles from molybdenum base alloys wherein strength properties imparted by work hardening are not lost through the steps of the method.

Another object is to provide improved upsetting forging processes for the manufacturing of articles from molybdenum base alloys which processes result in an optimum amount of reduction of material at temperatures which will not cause loss of the material's strength.

Still another object is to gradually build up the amount of cold work in an article being formed without recrystallization taking place and therefore obtain a balance of strength, ductibility and resistance to recrystallization.

Briefly stated in accordance with one aspect of our invention, we provide a process for making articles from an arc-cast molybdenum base alloy comprising an optional upsetting operation conducted at about 2500°–3000° F. to bring about a reduction in material up to about 50% and then a forging operation conducted at about 2000°–2450° F. to further reduce the material about 50–95%. The forging operation may be followed by an annealing operation for about one hour at about 1900°–2100° F. to relieve any residual stresses in the material.

While the specification concludes with the claims particularly pointing out and distinctly claiming our invention, it is believed that our invention will be better understood from the following description taken in connection with the accompanying drawing in which:

FIGURE 1 is a perspective view of a rod at the start of our method;

FIGURE 2 is a perspective view of an upset rod;

FIGURE 3 is a perspective view of a block-forged blade;

FIGURE 4 is a perspective view of a finish-forged blade.

Referring to the drawing, a typical method for the production of articles such as gas turbine blades made from molybdenum base alloys originally in the form of plate, rod or bar stock includes an "upsetting" operation if the article or blade is relatively large. The results of such an operation is shown in FIGURE 2. "Upsetting" is a metal working operation similar to forging in which the metal flows such as along the axis of the rod, bar or plate under axial compression. If the article to be made is relatively small, the upsetting operation may be omitted. After upsetting, a hammer, press or roll forging operation is used which may include a "block forging" step to produce approximately the final shape and a "finish-forging" step to impress on the article the final shape. A "block-forged" blade is shown in FIGURE 3; a "finished-forged" blade is shown in FIGURE 4. A "hot drop forging" step may be added after the finish-forging step to restore accurate dimensions or eliminate any distortion which may have occurred after the finish-forging step, for example, as a result of removing excess material by "flash trimming" or by grinding or polishing of the finish-forged blade.

In order for a method as described above to be useful, it is important that the level of cold work obtained from the forging steps result in a good balance of strength, ductibility and resistance to recrystallization. This is achieved through use of the proper temperatures during working. Too high a forging temperature would cause recrystallization during forging and would produce blades inferior in strength and ductility; too low a forging temperature would produce too hard a material and a blade having a relatively low recrystallization temperature, therefore a relatively low maximum operating temperature.

Our invention will be better understood from the following examples which are given by way of illustration and not in any way by limitation.

EXAMPLE 1

The commercial development of a molybdenum base alloy comprising in percent by weight about 0.3–0.75 titanium, a maximum of 0.06 carbon with the balance essentially molybdenum provided industry with an alloy having a significant improvement in strength and recrystallization characteristics over other molybdenum base alloys. For example, the recrystallization temperature of this alloy is in the range of 2350–2450° F.

To start our method which uses conventional upsetting, forging and furnace equipment well known in the metallurgical art, we used a bar, as in FIGURE 1. It had the composition of the above molybdenum alloy; it was about ⅞″ in diameter and about 9⅞″ long; and it had been annealed to a hardness level of about 190–210 VHN (Vickers Hardness Number). Since molybdenum alloys oxidize readily in air at relatively low temperatures, we used furnaces having an inert or reducing atmosphere for all of the heating and annealing steps in our process. After heating to a temperature of about 2500–2600° F., we upset the bar using a 1½″ horizontal action press having a three pass die setup to produce the shape shown in FIGURE 2. After upsetting, we performed a series of forging operations using a 2,000 pound drop hammer although press or roll forging could be used equally well. The first forging operation was a block-forging step performed after the upset bar was heated to a temperature of about 2350° F. The shape of FIGURE 3 was thereby produced. The second forging operation was a two phase finish-forging step, the first we conducted after heating the blocked article to about 2300° F. and the second or final we conducted after heating the initially finished article to about 2250° F. Thus we produced the blade of FIGURE 4. If, upon cooling or treating as by grinding after the final finish-forging operation, the blade was warped or dimensionally inaccurate, we conducted a "hot drop" forging operation after heating to about 2200° F. After the hot drop forging operation, we annealed the blade at 2000° F. for one hour to relieve any residual stresses which might contribute to the formation of cracks during subsequent grinding or machining operations. We found the minimum working temperature in this example to be about 1800° F. The following Table I not only summarizes the operation of the method in this example and the temperatures at which they were conducted but also shows the percent reduction in material after such operation.

Table I

| Operation | Temperature (° F.) | Approximate Percent Reduction of Material |
| --- | --- | --- |
| Upset | 2,500–2,600 | 50 |
| Block | 2,350 | 50–90 |
| 1st Finish | 2,300 | 10–25 |
| Final Finish | 2,250 | 5–20 |
| Hot Drop | 2,200 | |
| Anneal (1 hr.) | 2,000 | |

In the above table, the great variation in reduction of material occurred because of the configuration of the blade airfoil 10 of FIGURES 3 and 4: the material at the edges 11 were reduced by about 50% because they were near the periphery of the rod and the material at the center of the airfoil was reduced about 90% from the original bar diameter. For a more uniform or less drastic reduction in thickness, it would be better to start with a flat bar or sheet so that no more than about 70% reduction in material is necessary.

EXAMPLE 2

The operations of Example 1 were repeated on the same material except that the procedure was shortened by combining the first and final finish operations. The following Table II summarizes the operations and their temperatures again showing a remarkable percent reduction in material after each operation.

Table II

| Operation | Temperature (° F.) | Approximate Percent Reduction of Material |
| --- | --- | --- |
| Upset | 2,500–2,600 | 50 |
| Block | 2,300 | 50–95 |
| Finish | 2,250 | 5–20 |
| Hot Drop | 2,200 | |
| Anneal (1 hr.) | 2,000 | |

The best hardness range for this titanium-molybdenum alloy which achieves a good balance of strength and recrystallization temperature is in the range of 230–280 VHN with the optimum range being 240–260 VHN. The cycles of Examples 1 and 2 produced average hardnesses for a blade as shown in the following Table III. Hardness readings were taken in shank 12, dovetail 15 and airfoil 10 of FIGURE 4. As used in Table III, airfoil (G) refers in FIGURE 4 to an airfoil area which is a hypothetical band on the airfoil, the center of the band being about ¼ inch from, and approximately parallel to, platform 13. Airfoil (H) refers in FIGURE 4 to an airfoil area which is a hypothetical band on the airfoil, the center of the band being about ¼ inch from, and approximately parallel to tip 14.

Table III

| Section | Vickers Hardness Number | |
| --- | --- | --- |
| | Example 1 | Example 2 |
| Original Bar | 190–210 | 190–210 |
| Dovetail | 241 | 279 |
| Shank | 233 | 265 |
| Airfoil (G) | 252 | 261 |
| Airfoil (H) | 267 | 262 |

It is to be noted that a uniformity of hardness across the whole blade exists especially from the method of Example 2.

In order to determine the resistance to recrystallization after working the molybdenum base alloy as in Examples 1 and 2, blades were heated for one-half hour at about 2200° F. No significant loss of hardness or change in microstructure was noted after this test.

"Tensile strength" is the figure obtained when the maximum load recorded during straining is divided by the cross-sectional area of the specimen before straining. The following Table IV outlines the results of testing to determine tensile strength on blades resulting from the methods of Examples 1 and 2. Besides showing tensile strength, it gives the "0.2% yield strength" which is the stress at which a material exhibits 0.2% deviation from the proportionality of stress to strain.

Table IV

| Example | Section of Blade | Temp. (° F.) | Tensile Strength (1,000 p.s.i.) | 0.2% Yield Strength (1,000 p.s.i.) | Percent Elongation (in/in.) | Percent Reduction Cross Sectional Area |
| --- | --- | --- | --- | --- | --- | --- |
| 1 | Shank | Room | 95 | 91 | 13 | 28 |
| | do | 1,200 | 54 | 48 | 15 | 87 |
| | Airfoil | 2,000 | 52 | 48 | 13 | 82 |
| 2 | Shank | Room | 114 | 97.5 | 7 | 13 |
| | do | 1,200 | 61 | 59 | 12 | 87 |
| | do | 2,000 | 50 | 48 | 17 | 88 |
| | Airfoil | 2,000 | 57 | 55 | 15 | 85 |

One method of representing "stress rupture strength," the stress obtained by dividing the load at the time of failure by the original area supporting that load is to present the stress at a given temperature which will cause the material to fracture after 100 hours. After the cycle as outlined in Example 1, the 1200° F. 100 hour stress rupture life was seen to be a minimum of 45,000 p.s.i. in the shank and at 2000° F. it was noted as about 39,000 p.s.i. for the airfoil.

EXAMPLES 3 AND 4

The operations of Example 1 were repeated for Examples 3 and 4 on an arc-cast molybdenum base alloy material comprising in percent by weight 0.2–0.5 columbium, a maximum of 0.06 carbon, with the balance essentially molybdenum. The following Table V summarizes the operations and their temperatures, again showing the percent reduction in material after each operation:

Table V

| Operation | Temperature (° F.) | | Approximate Percent Reduction of Material |
|---|---|---|---|
| | Example 3 | Example 4 | |
| Upset | 2,600 | 3,000 | 50 |
| Block | 2,150 | 2,200 | 50–90 |
| 1st Finish | 2,150 | 2,150 | 10–25 |
| Final Finish | 2,150 | 2,100 | 5–20 |
| Hot Drop | 2,150 | 2,050 | |
| Anneal (1 hr.) | 1,900 | 1,900 | |

In determining the physical properties of the blades after our series of operations, we noted that they were similar to those shown in Table IV for the methods of Examples 1 and 2. In general the tensile strengths and 0.2% yield strengths were slightly lower for this material whereas the percent elongation and percent reduction in cross-sectional area were slightly higher than the molybdenum alloy used in Examples 1 and 2.

The change in cycle from that shown in Example 3 of Table V to Example 4 resulted in an increase in tensile strength in the shank at 1200° F. to about 62,000 p.s.i. After the cycle as outlined in connection with Example 3, the 1200° F., 100 hour stress rupture life was seen to be greater than about 46,000 p.s.i. and at 1800° F. was noted as about 31,000 p.s.i.

In order to determine the effect of our processing on recrystallization temperature, we heated a series of processed samples at about 2100° F. for about one hour. No significant loss in hardness was noted.

EXAMPLES 5–7

The composition of other molybdenum base alloys which we have tested and the forging ranges for those alloys which give the desirable properties and similar reduction of material as mentioned in connection with the examples above are listed in the following Table VI:

Table VI

| Example | Composition (% by Weight) | Forging Temp. Range (° F.) |
|---|---|---|
| 5 | 0.8 V; 0.03 C; balance essentially Mo | 2,000–2,200 |
| 6 | 2. W; 0.03 C; balance essentially Mo | 2,000–2,200 |
| 7 | 0.05 Zr; 0.03 C; balance essentially Mo | 2,100–2,350 |

EXAMPLE 8

We have found that increasing the carbon content of the above type of alloy is beneficial in raising the recrystallization temperature. The following Table VII summarizes the operations and their temperatures for a molybdenum base alloy including about 0.15% by weight carbon:

Table VII

| Operation | Temperature (° F.) | Approximate Percentage Reduction of Material |
|---|---|---|
| Upset | 2,800 | 50 |
| Block | 2,400–2,450 | 50–90 |
| 1st Finish | 2,350–2,400 | 10–25 |
| Final Finish | 2,300–2,350 | 5–20 |
| Hot Drop | 2,250–2,300 | |
| Anneal (1 hr.) | 2,100 | |

In the foregoing description we have disclosed an improved manufacturing method for making molybdenum base alloy articles. Although we have described our invention in connection with specific examples, these examples are to be construed as illustrative of rather than limitations on our invention. Those skilled in the art of metallurgical manufacturing and heat treatment will readily understand the modifications and variations of which our invention is capable. We intend in the appended claims to cover such modifications and variations that come within the true spirit and scope of our invention.

What we claim as new and desire to secure by Letters Patent of the United States is:

1. In the art of manufacturing a molybdenum base alloy consisting essentially of in percent by weight about 0.3–0.75 titanium, up to about 0.06 carbon with the balance essentially molybdenum into articles of high strength and ductility, and the process of: reducing the material up to about 50% in an upsetting operation by heating to a temperature above the alloy's recrystallization temperature between about 2500–2700° F., then immediately upsetting; reducing the upset material an additional 50–95% by heating to a temperature below the alloy's recrystallization temperature between about 2300–2350° F., then immediately block-forging; reducing the block-forged material an additional 5–25% in at least one finish-forging operation by heating to a temperature below the alloy's recrystallization temperature between about 2250–2300° F., then immediately finish-forging; and then removing any distortion from the finish-forged material by heating to a temperature below the alloy's recrystallization temperature of about 2200° F., then immediately hot drop forging.

2. The method as described in claim 1, including the additional step after hot drop forging of: heating at about 2000° F. for about one hour to relieve stress in the material.

3. In the art of manufacturing a molybdenum base alloy consisting essentially of in percent by weight about 0.2–0.5 columbium, up to about 0.06 carbon with the balance essentially molybdenum into articles of high strength and ductility, the process of: reducing the material up to about 50% in an upsetting operation by heating to a temperature above the alloy's recrystallization temperature between about 2600–3000° F., immediately followed by upsetting; reducing the upset material an additional 50–90% in a block-forging operation by heating to a temperature below the alloy's recrystallization temperature between about 2150–2200° F., then immediately block-forging; reducing the block-forged material an additional 5–25% in at least one finish-forging operation by heating to a temperature below the alloy's recrystallization temperature between about 2100–2150° F., then immediately finish-forging; and then removing any distortion from the finish-forged material by heating to a temperature below the alloy's recrystallization temperature between about 2050–2150° F., then immediately hot drop forging.

4. The method as described in claim 3 including the additional step after hot drop forging of: heating at about 1900° F. for about one hour to relieve stress in the material.

5. In a method of manufacturing a high strength, ductile article from a material of a molybdenum base alloy consisting by weight essentially of 0.05–2% of an element selected from the group consisting of Ti, Cb, V, W and Zr; up to about 0.15% carbon, with the balance essentially molybdenum, said Ti being in the range of 0.3–0.75%, said Cb being in the range of 0.2–0.5%, said V being in the range of up to about 0.8%, said W being in the range of up to about 2%, said Zr being in the range of up to about 0.05%, through a series of dimension reducing steps conducted at progressively decreasing temperatures, the steps of: reducing the material up to about 50 percent in an upsetting operation by heating at a temperature above the alloy's recrystallization temperature between 2500–3000° F., then immediately upsetting; reducing the upset material an additional 50–95% in a block-forging operation by heating below the alloy's recrystallization temperature and between 2150–2450° F., then immediately block-forging; and then reducing the block-forged material an additional 5–25% in at least one finish-forging operation by heating below the alloy's recrystallization temperature and between about 2000–2400° F., then immediately finish-forging.

6. The method as described in claim 5 including the additional step after finish-forging of heating at about 1900–2100° F. for about one hour to relieve stress in the material.

References Cited in the file of this patent

UNITED STATES PATENTS

| | | |
|---|---|---|
| 1,345,045 | Waters | June 29, 1920 |
| 2,666,721 | Bechtold et al. | Jan. 19, 1954 |
| 2,678,269 | Ham et al. | May 11, 1954 |
| 2,678,272 | Ham et al. | May 11, 1954 |
| 2,692,216 | Baker | Oct. 19, 1954 |
| 2,692,217 | Baker | Oct. 19, 1954 |
| 2,721,138 | Baker et al. | Oct. 18, 1955 |
| 2,903,385 | Revere et al. | Sept. 8, 1959 |